Nov. 14, 1933.                L. B. CUDDY                1,935,079
                        SAFETY BLADE SHARPENER
                        Filed May 1, 1928            4 Sheets-Sheet 1
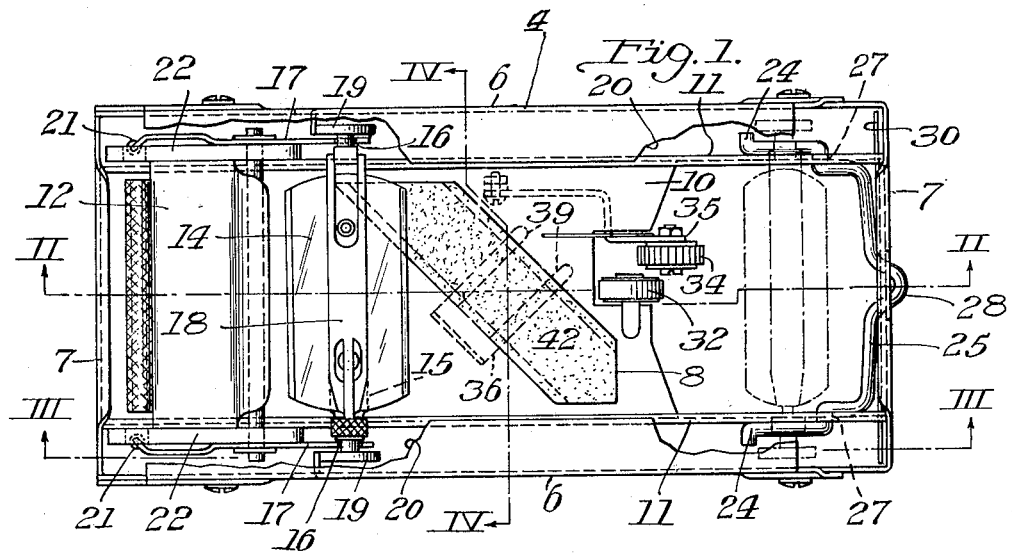
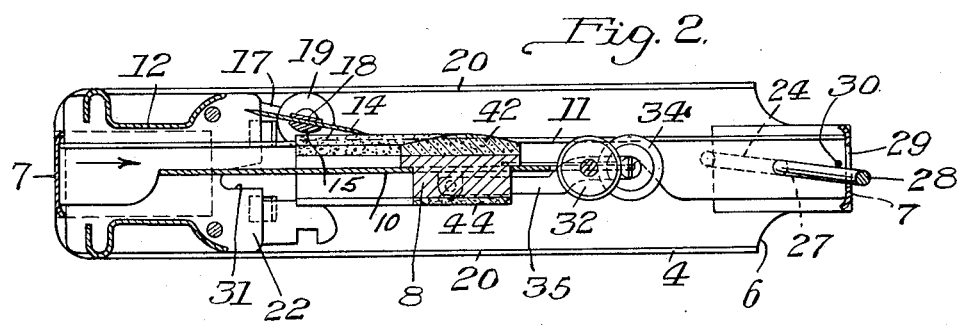
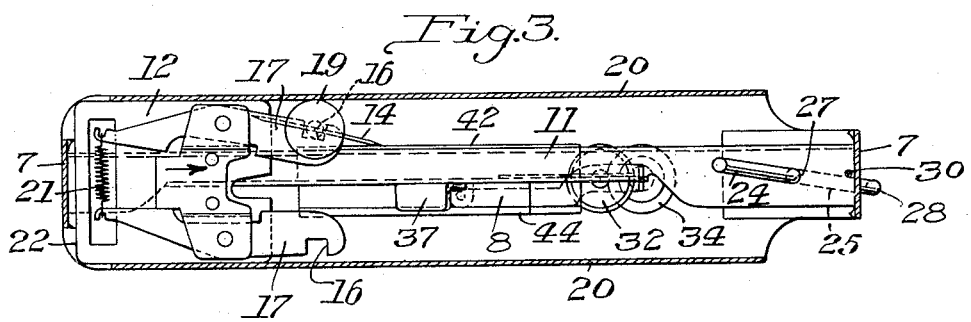
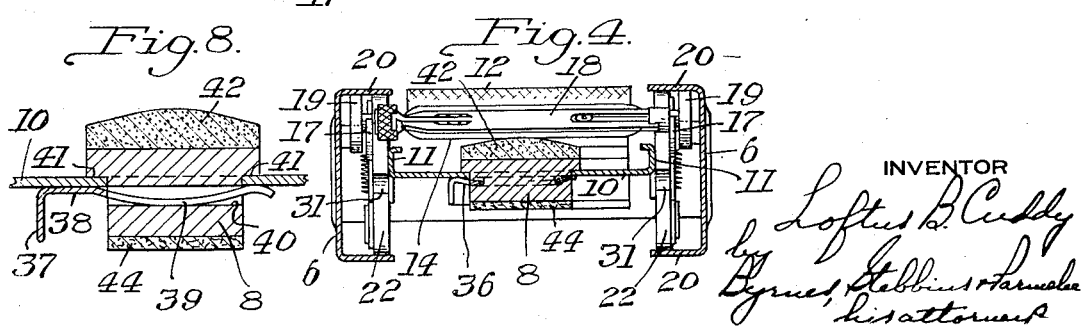
INVENTOR
Loftus B. Cuddy
by Byrnes, Stebbins & Parmelee
his attorneys Nov. 14, 1933.  L. B. CUDDY  1,935,079
SAFETY BLADE SHARPENER
Filed May 1, 1928  4 Sheets-Sheet 2
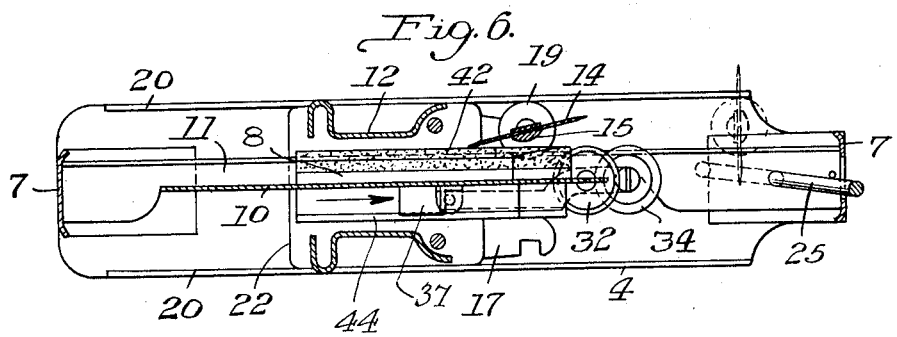
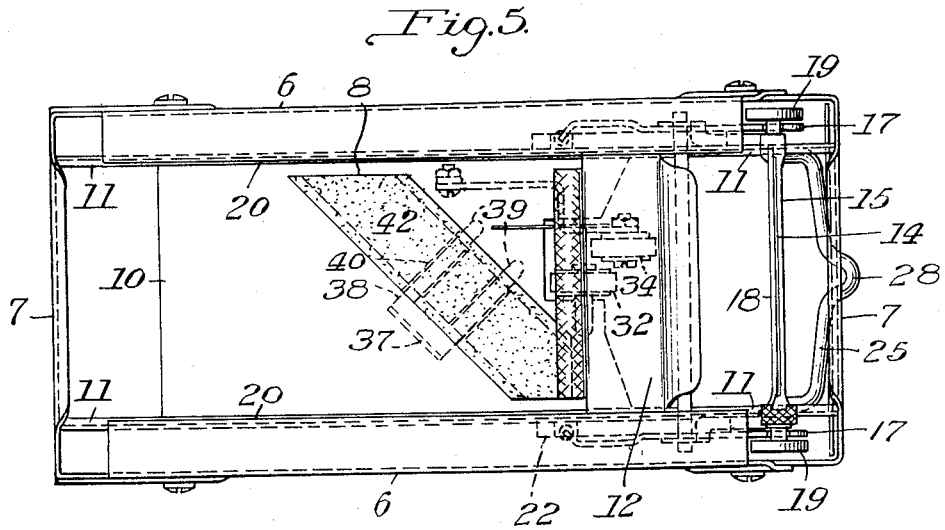
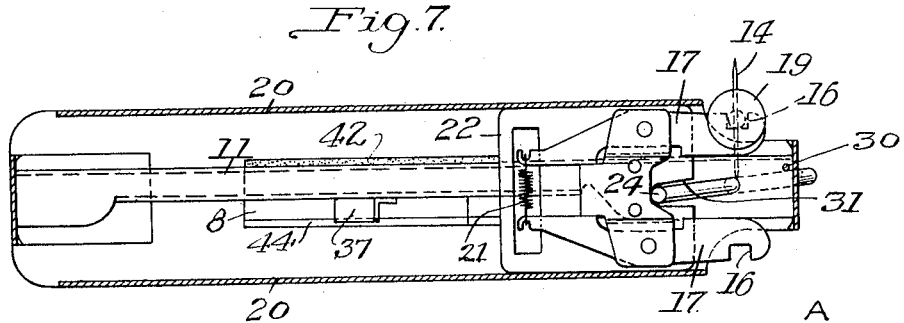
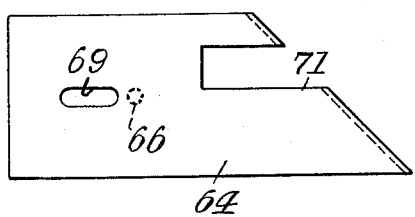
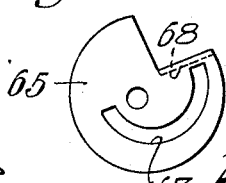
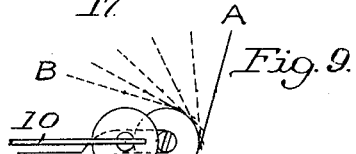

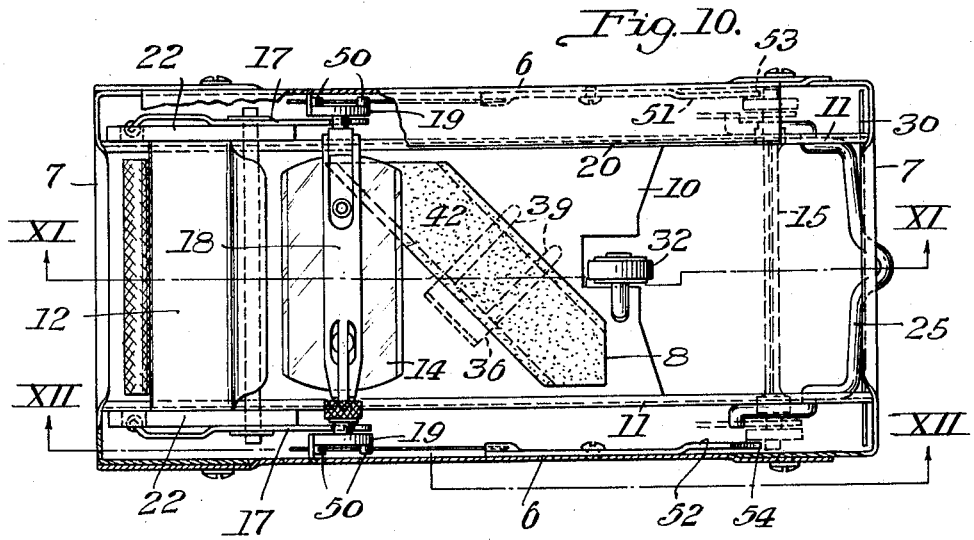
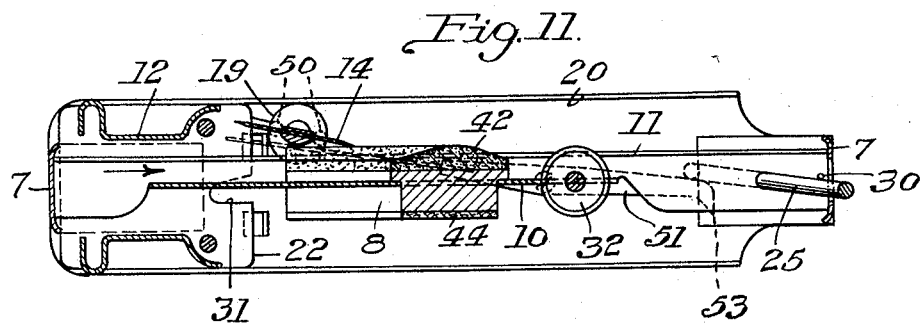
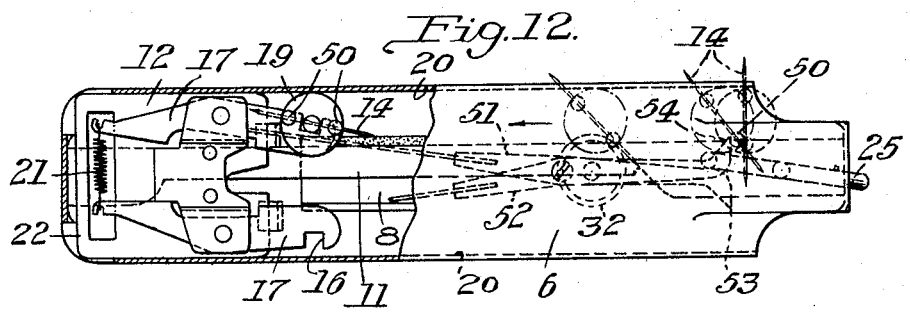
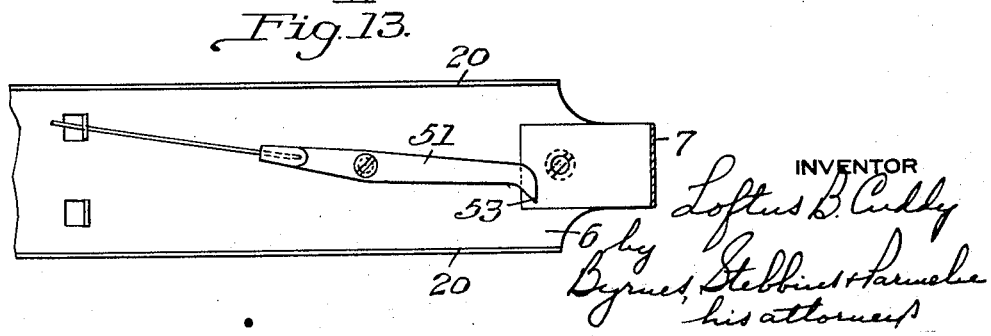

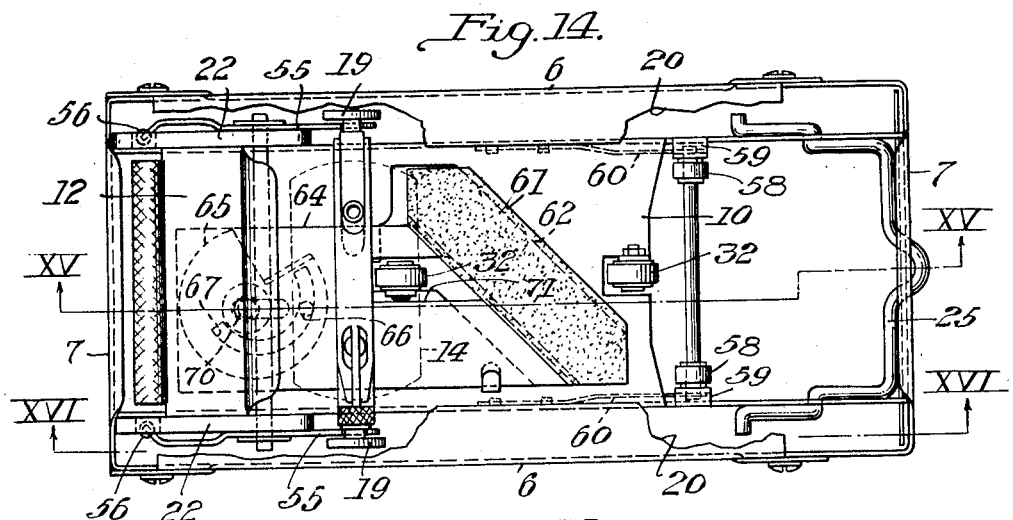
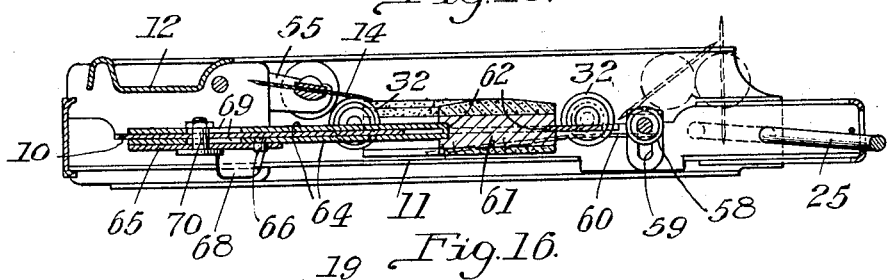
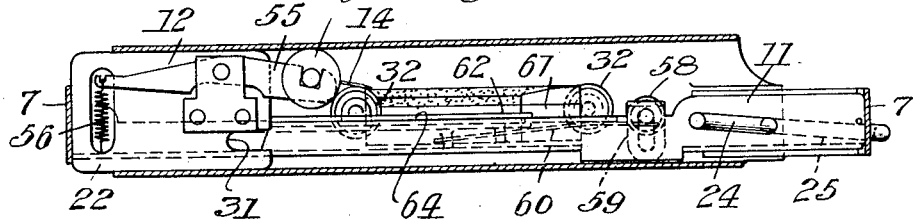
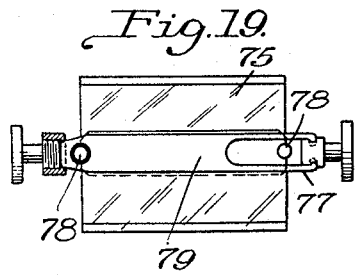
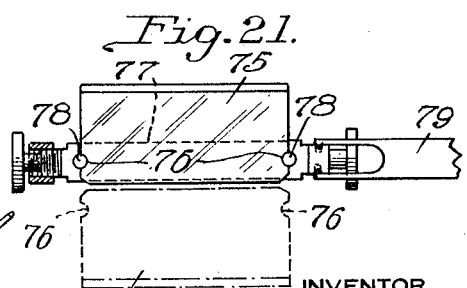

Patented Nov. 14, 1933

1,935,079

UNITED STATES PATENT OFFICE 1,935,079

SAFETY BLADE SHARPENER

Loftus B. Cuddy, Sewickley, Pa.

Application May 1, 1928. Serial No. 274,218

4 Claims. (Cl. 51—153)

My invention relates to sharpening devices, and particularly to devices for sharpening safety razor blades.

Such blades are frequently thrown away after one or two uses or when the edge or edges become slightly dulled. These cutting edges may be readily renewed by a honing and stropping operation, so that by individual sharpening the life of a razor blade may be measured in terms of weeks and months instead of days.

A sharpening device for razor blades is shown and described in the patent to Barsch, No. 1,399,241, issued December 6, 1921. In the structure of the Barsch patent, a frame is provided in which a blade-carrying carriage is moved back and forth for drawing the edge of the razor blade across a hone or a strop. In the Barsch structure, pressure between the blade edge and the sharpening device over which it is passed is obtained by frictional engagement between a flat sided wheel and the surface of a race-way formed in the frame. The blade is turned 180° during each complete stroke by permitting the wheel to turn upon its flat side. To change the blade from a honing to a stropping operation or vice versa, the blade is removed from one side of the carriage and moved to the opposite side of the sharpening device. The sharpening device is provided with a honing surface on one side and a stropping surface on the other.

I have found that a positive turning movement of the blade may be secured by providing circular wheels for the blade holder, and positively turning the wheels at a definite point in the forward and backward movement of the blade holder instead of relying upon the flat side of the wheel for turning it. One form of the reversing mechanism is a spring mounted in the frame, permitting the wheel of the blade holder to slide thereover during movement in one direction, but cooperatively engaging the wheel to turn it by an amount sufficient to reverse the blade being sharpened at the beginning of a reverse movement. A modified form of the reversing mechanism is provided by a roller, past which the blade slides during movement in one direction and which positively turns the blade before it can be moved in a reverse direction.

Safety for the operator and rigidity of the frame are secured by completely closing the end of the frame in which the blade is turned. A releasing mechanism for the blade holder projects outwardly through the end closure. Accordingly, the operator manipulates the releasing mechanism from without the frame, thereby eliminating chances for accidental cutting of the hands.

In another form of the invention, the construction is simplified by having the blade always move in the same side of the frame. In such a construction, the block holding the hone and strop is reversible. Differences in the angle at which the blade crosses the strop and hone are secured by having the distance between the center of the block and the surface of the hone greater than the distance from the center of the block to the surface of the strop. Ease of reversal of the block is had by providing a quickly detachable portion of the block support. Safety for the operator in manipulating the block support is secured by providing an actuating device for the quickly detachable portion of the support disposed at a part of the frame that is inaccessible to the blade being sharpened.

The accompanying drawings illustrate several modifications of the present preferred embodiment of the invention, in which—

Figure 1 is a plan view of a sharpening device embodying my invention, parts of the frame being broken away, Figure 2 is a longitudinal sectional view thereof taken along the sectional line II—II of Figure 1, Figure 3 is a longitudinal sectional view thereof taken along the section line III—III of Figure 1, Figure 4 is a transverse view thereof taken along the section line IV—IV of Figure 1, Figure 5 is a plan view of the sharpener with the moving parts at the opposite end of the frame from that shown in Figure 1, Figure 6 is a longitudinal sectional view of the sharpening device taken along the section line II—II of Figure 1, with the moving parts shown in the middle of the stroke, and the honing block shown in elevation, Figure 7 is a longitudinal sectional view of the sharpening device taken along the section line III—III of Figure 1, with the movable parts at the opposite end of the stroke from that shown in Figure 3, Figure 8 is an enlarged sectional view of the sharpening block illustrating the securing means, Figure 9 is a diagrammatic view showing the positions occupied by a blade during a reversing operation, Figure 10 is a plan view of a modified form of the invention, with portions of the casing broken away, Figure 11 is a longitudinal sectional view taken along the section line XI—XI of Figure 10, Figure 12 is a longitudinal sectional view taken along the section line XII—XII of Figure 10, Figure 13 is an enlarged view of a detail of the blade-turning mechanism, Figure 14 is a plan view of a further modification of the invention, with parts of the casing broken away, Figure 15 is a longitudinal sectional view taken along the section line XV—XV of Figure 14, Figure 16 is a longitudinal sectional view taken along the section lines XVI—XVI of Figure 14, Figure 17 is a plan view of a portion of the block-securing mechanism, Figure 18 is a plan view of a detail of the actuating mechanism for securing the mechanism shown in Figure 17, Figure 19 is a plan view of a blade holder for a pair of razor blades, each having a single cutting edge, Figure 20 is an edge view thereof; and, Figure 21 is a diagrammatic plan view of the blade holder shown in Figure 19.

Referring to Figures 1 to 9 inclusive, a blade sharpener comprises a frame 4, constituted by side plates 6 and end plates 7, in which a sharpening block 8 is supported by a plate 10, secured to the end plates 7 by bars 11, and a carriage 12 movable longitudinally of the frame 4.

For supporting a double-edged razor blade 14 during a sharpening operation, a flat sided shaft 15 is seated in notches 16 in the ends of levers 17 mounted on the carriage 12. For securing the blade 14 to the shaft 15, a keeper 18, substantially similar to the one shown and described in the Barsch patent, is provided. A turning movement is given to the shaft 15 and blade 14 by circular wheels 19 mounted on the ends of the shaft 15, and engaging the under surface of the inturned edges 20 of the side plates 6. Firm engagement between the wheels 19 and the raceway constituted by the inturned edges 20, is secured by providing tensioning means, such as a spring 21 between the ends of the levers 17.

Carriage 12 is stopped at the rear end of its movement, by the engagement of its sidewalls 22 with one of the end plates 7. Movement in a forward direction is halted by the engagement of the side walls 22 with the outwardly projecting ends 24 of a pivotally mounted catch 25. The catch 25 is pivotally supported by intermediate offset portions 27 extending through the bars 11. Space for a turning movement of the blade 14 is provided between the end of the plate 10 and the catch 25. Safety in operating the catch 25 is secured by having a handle portion 28 thereof, project through an opening 29 in the adjacent plate 7. Catch 25 is biased into a position to engage the side walls 22 by a spring 30. To release the catch 25, the handle is raised sufficiently to permit the ends 24 to enter notches 31 in the side walls 22, as shown in Figure 7.

Injury to the edges of blade 14 when it passes from engagement with the sharpening block 8 is prevented by providing a sustaining roller 32, pivotally mounted on the plate 10. For turning the blade after it has passed the roller 32, there is provided a roller 34 supported on an arm 35 projecting outwardly from and in the plane of the plate 10.

Referring to Figures 1 and 8, the sharpening block 8 is secured to the plate 10 by a keeper 36. This keeper is constituted by an upturned end or handle portion 37, a body portion 38, and a pair of resilient fingers 39 that extend through openings 40 in the block 8. The body portion 38 and the tips of fingers 39 bear against the plate 10 while the central portion of the fingers bear against the central portion of openings 40, thereby drawing shoulders 41 on the block 8 into firm engagement with the opposite side of the plate 10.

One surface of the block 8 is provided with a honing surface 42 and the other is provided with a stropping surface 44. The stropping surface preferably extends outwardly from the plate 10 less than does the honing surface, in order to insure a sharper angle to the edge of the blade during the stropping operation than is imparted during the honing operation.

To sharpen a two-edged razor blade, the shaft 15 is mounted in the pair of notches 16 in the carriage 12, on the honing side of the sharpener. When the carriage is then moved rearwardly of the frame, frictional engagement between the wheels 19 and the inturned edges 20 of the frame turns the blade in a clockwise direction as viewed in Figure 2. The blade 14, after passing over the rollers 32 and 34, comes into engagement with the honing surface 42. As the block 8 is set diagonally to the axis of the frame 4, different portions of the edge of the blade 14 successively engage the honing surface throughout the entire rear stroke. When carriage 12 is stopped by engagement with the end plates 7, and forward movement is started, the blade is turned through approximately 45° by the turning movement of the wheels 19. At the end of the forward stroke, the blade passes over the rollers 32 and 34 and is turned into the position A, Figure 9, by the turning movement of the wheels 19. Reverse movement of the carriage causes the blade to assume the successive positions shown from A to B, with the result that the blade is turned through 180°. The foregoing cycle of operations is continued until the blade has been sufficiently honed.

For stropping the blade, the shaft 15 is removed from the honing side of the carriage 20 and transferred to the stropping side, where the same cycle of mechanical operations takes place as on the honing side, but preferably at a slightly steeper angle to give a proper cutting edge.

Referring to Figures 10 to 13 inclusive, I have shown a modified form of the invention, in which a positive turning movement of the blade at the forward end of the stroke is insured. Pins 50 are secured to the outer surfaces of the wheels 19 in substantial parallelism with the plane of the blade 14 when in position in the holder 18, and constitute, in effect, crank-arms for the holder. Spring pressed levers 51 and 52 are mounted in the inner walls of the side plates 6. The levers 51 and 52 terminate in fingers 53 and 54, respectively. Finger 54 projects upwardly and is used when the blade is in the honing position. Finger 53 extends downwardly and is used when the blade is in the stropping position.

In the operation of this form of my invention, as the carriage moves forward, the inner pin 50 rides over either the finger 53 or 54, and the finger springs into place behind the pin 50. Return movement of the pin 50 is resisted by the finger 53 or 54, until the pin has turned sufficiently to clear the finger, thereby turning blade 14. The turning movement imparted to the pin turns the blade sufficiently so that when it passes the roller 32, it has turned a total of 180°.

Referring to Figures 14 to 18 inclusive, I have provided a modification of the invention in which the honing and stropping operations take place in the same side of the frame. In this modification of the invention a single lever 55 at each side of the carriage 12 is secured by a spring 56 to the frame of the carriage 12. Reversal of the blade is secured by a pair of rollers 58 mounted in guideways 59. As the blade travels over the sustaining roller 32, it is turned by friction to engage rollers 58 which are depressed against a spring 60. When the blade 14 has passed the rollers 58, they spring upwardly to engage the opposite sides of the blade upon the return movement thereof. The blade is ultimately turned through 180° by the engagement of the rollers 58 with the opposite side thereof.

Reversibility of the sharpening block 61 is obtained by providing substantially straight side walls with grooves 62 on opposite edges thereof. A sharper angle between the stropping surface and the blade than between the honing surface and the blade is secured by placing the grooves 62 nearer the stropping surface of the block than the honing surface.

To insure quick reversal of the block 61, I provide a sliding plate 64 that seats in one of the grooves 62 and presses the plate 10 into the other groove. Plate 64 is actuated by a cam 65. To insure safety to the operator, cam 65 is preferably disposed to the rear of the plate 10.

Referring to Figures 17 and 18, the plate 64 is provided with a pin 66 that engages a slot 67 in the cam 65. A handle 68 is disposed on the cam 65. Plate 64 is provided with a slot 69 to permit its movement without interfering with the pivot pin 70 of the cam 68, and is provided with a notch 71 to permit it to slide by a sustaining roller 32 located at the rear of the block. In this form of my invention, the blade, when once seated in the lever 65, is moved back and forth and turned at the end of each forward stroke. When it is desired to change from the honing to the stropping surface, or vice versa, the operator grasps the cam handle 68 and turns it. The pin 66 moves in the slot 67 and draws the plate 64 rearwardly, thereby releasing the block 61. The block is then inverted and the cam 65 turned to move the plate 64 into the groove 62. The foregoing operation is carried on without movement of the blade.

Referring to Figures 19 to 21, inclusive, I have shown a holder for sharpening single-edged blades of well-known construction. Blades 75 are provided with notches 76 near their back edges. A pair of blades 75 are placed in a holder 77 with their cutting edges facing outwardly, and the notches 76 engaging pins 78 in the holder. After the blades 75 are in position, a keeper 79 is secured in place over the pins 78 with any suitable mechanism, an example of which is shown in the Barsch patent heretofore referred to.

With this form of my invention, two single-edged blades are held together as a unit and sharpened in the same manner as is a double-edged blade. The terms "single-edged" and "double-edged" blades, as heretofore employed, are understood to refer to the number of cutting edges on the razor blade.

While I have illustrated and described several modifications of the preferred form of my invention, it is to be understood that it may be otherwise embodied without departing from the scope of the appended claims.

I claim:

1. A blade sharpening device comprising a frame, means for moving a blade relative thereto, sharpening means for the blade comprising a member having faces of different characteristics, the sharpening means being provided with grooves at different distances from said faces, and supporting means for the sharpening means engaging the grooves of the latter, whereby upon reversal of the sharpening means, the angular relation between its faces and the plane of the blade is varied.

2. A device for sharpening the blades of safety razors comprising in combination a frame having races, a carriage slidably arranged in said frame, a sharpening body mounted in said frame and arranged obliquely in the path of the carriage, a blade-holder rotatably mounted in levers, said levers being pivotally mounted on said carriage, springs acting on said carriage, circular wheels fixed to the blade-holder, said circular wheels being pressed against the races by said springs, and said circular wheels positively turning the blade-holder around after the blade has passed over the sharpening body, and means for maintaining the blade-holder in its turned position upon movement of the carriage in the reverse direction, including pins secured to the outer surface of one of the wheels parallel to the blade, and a spring-pressed lever mounted on the inner wall of the frame alongside of the movement of the carriage, said lever having a finger on its end disposed in the path of one of the pins whereby as the carriage moves forward, one of the pins rides over and depresses the finger which springs into place behind the pin and upon reverse movement of the carriage the pin engages the finger and turns the wheels until the pin has been moved sufficiently to clear the finger.

3. A blade sharpening device comprising a frame, means for moving a blade relative thereto, sharpening means for the blade comprising a member having faces of different characteristic, the sharpening means being provided with grooves at different distances from said faces, supporting means for the sharpening means engaging the grooves of the latter, whereby upon reversal of the sharpening means, the angular relation between its faces and the plane of the blade is varied, said supporting means comprising a plate secured to said frame and a plate slidably supported by said frame fitting grooves in either side of said sharpening means.

4. A blade sharpening device comprising a frame, means for moving a blade relative thereto, sharpening means for the blade comprising a member having faces of different characteristic, the sharpening means being provided with grooves at different distances from said faces, supporting means for the sharpening means engaging the grooves of the latter, whereby upon reversal of the sharpening means, the angular relation between its faces and the plane of the blade is varied, said supporting means comprising a plate secured to said frame and a plate slidably supported by said frame fitting grooves in either side of said sharpening means, and means for moving and holding said slidable plate in a desired position in the frame relative to the sharpening means.

LOFTUS B. CUDDY.